(12) United States Patent
Datas et al.

(10) Patent No.: US 12,252,272 B2
(45) Date of Patent: Mar. 18, 2025

(54) AIRCRAFT FLOOR GRID TRANSPORT SYSTEM FOR ASSEMBLING AN AIRCRAFT FUSELAGE BARREL AND METHOD OF CALIBRATING SAID TRANSPORT SYSTEM

(71) Applicant: AIRBUS OPERATIONS (S.A.S.), Toulouse (FR)

(72) Inventors: Jean-Marc Datas, Toulouse (FR); Thomas Cartereau, Toulouse (FR); Jacques Bouriquet, Toulouse (FR); André Aquila, Blagnac (FR); Nicolas Darbonville, Blagnac (FR); Thomas Autret, Blagnac (FR); Joël Barboule, Toulouse (FR); Sébastien Bayonne, Toulouse (FR); Patrick Guerin, Toulouse (FR); Sjoerd Van Der Veen, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 55 days.

(21) Appl. No.: 18/357,741

(22) Filed: Jul. 24, 2023

(65) Prior Publication Data
US 2024/0025559 A1   Jan. 25, 2024

(30) Foreign Application Priority Data
Jul. 25, 2022   (FR) ...................................... 2207611

(51) Int. Cl.
*B64F 5/10*   (2017.01)
(52) U.S. Cl.
CPC ...................................... *B64F 5/10* (2017.01)

(58) Field of Classification Search
CPC ..... B64F 5/10; B64F 5/50; B64C 1/18; Y10T 29/49622
See application file for complete search history.

(56) References Cited

U.S. PATENT DOCUMENTS

| | | | | |
|---|---|---|---|---|
| 2,370,083 A | * | 2/1945 | Smith | B64F 5/10 29/467 |
| 2,374,894 A | * | 5/1945 | Pioch | B64F 5/10 29/466 |
| 2,391,510 A | * | 12/1945 | Pioch | B25H 1/00 29/430 |

(Continued)

FOREIGN PATENT DOCUMENTS

| | | |
|---|---|---|
| DE | 102004056286 A1 | 5/2006 |
| EP | 1063166 A1 | 12/2000 |
| FR | 2788743 A1 | 7/2000 |

OTHER PUBLICATIONS

French Search Report for Application No. FR 2207611 dated Mar. 2, 2023, 2 pages.

*Primary Examiner* — Medhat Badawi
(74) *Attorney, Agent, or Firm* — Nixon & Vanderhye P.C.

(57) ABSTRACT

An aircraft floor grid transport system for assembling an aircraft fuselage barrel and method of calibrating the transport system are disclosed. The transport system includes a rectangular beam, a stabilizer device to be associated with referential positioning devices of an assembly platform and a plurality of fixing devices to be fixed to the floor grid, each of the fixing devices having a vertically adjustable length. The transport system makes it possible to handle the floor grid without deforming it in order to assemble a fuselage barrel.

15 Claims, 5 Drawing Sheets

(56) References Cited

U.S. PATENT DOCUMENTS

| | | | | |
|---|---|---|---|---|
| 2,472,317 | A * | 6/1949 | Sorensen | B64C 1/061 29/466 |
| 3,938,764 | A * | 2/1976 | McIntyre | B64C 1/18 244/129.1 |
| 4,259,776 | A * | 4/1981 | Roda | B64B 1/06 29/469 |
| 4,371,108 | A * | 2/1983 | Roggendorff | E02B 17/027 29/430 |
| 5,694,690 | A * | 12/1997 | Micale | B25J 9/1687 29/897.2 |
| 6,230,382 | B1 * | 5/2001 | Cunningham | B64F 5/10 29/709 |
| 6,408,517 | B1 * | 6/2002 | Lehmker | B64F 5/10 29/469 |
| 6,638,466 | B1 * | 10/2003 | Abbott | B29C 33/68 264/258 |
| 6,692,681 | B1 * | 2/2004 | Lunde | B29C 70/549 264/510 |
| 7,141,191 | B2 * | 11/2006 | Engwall | B29C 70/545 264/156 |
| 7,469,473 | B2 * | 12/2008 | Savoy | B62D 65/18 29/430 |
| 7,655,168 | B2 * | 2/2010 | Jones | B29C 70/44 425/417 |
| 7,966,729 | B2 * | 6/2011 | Frauen | B64F 5/10 29/281.1 |
| 8,146,222 | B2 * | 4/2012 | Frauen | B64F 5/10 228/49.1 |
| 8,240,607 | B2 * | 8/2012 | Pahl | B64C 1/0685 244/120 |
| 8,302,312 | B2 * | 11/2012 | Stephan | B64F 5/10 29/897 |
| 8,333,864 | B2 * | 12/2012 | Brennan | B29C 70/44 156/286 |
| 8,468,674 | B2 * | 6/2013 | Weber | B64F 5/10 29/430 |
| 8,752,293 | B2 * | 6/2014 | Jones | B29C 70/304 156/196 |
| 8,914,979 | B2 * | 12/2014 | Venskus | B64C 1/068 29/897 |
| 8,916,010 | B2 * | 12/2014 | Brennan | B29C 70/30 156/275.5 |
| 8,936,695 | B2 * | 1/2015 | Rotter | B29C 70/541 425/389 |
| 8,943,666 | B2 * | 2/2015 | Vera Villares | B64C 1/069 29/469 |
| 9,434,484 | B2 * | 9/2016 | Umlauft | B64F 5/10 |
| 9,770,871 | B2 * | 9/2017 | Brennan | B29C 70/30 |
| 10,322,791 | B2 * | 6/2019 | Evans | B64C 3/18 |
| 10,449,799 | B2 * | 10/2019 | Yamahiro | B44C 5/00 |
| 10,668,583 | B2 * | 6/2020 | Inagaki | B25J 11/007 |
| 10,814,488 | B2 * | 10/2020 | Tombe | B25J 13/00 |
| 10,960,620 | B2 * | 3/2021 | Nguyen | B29C 73/32 |
| 11,198,520 | B2 * | 12/2021 | Goto | G05B 19/402 |
| 11,267,585 | B2 * | 3/2022 | Datas | B23K 37/0426 |
| 11,465,371 | B2 * | 10/2022 | Pavlov | B32B 27/04 |
| 11,987,353 | B2 * | 5/2024 | Marcoe | B29C 35/0805 |
| 2001/0054228 | A1 * | 12/2001 | Lehmker | B23P 19/04 29/721 |
| 2002/0168184 | A1 * | 11/2002 | Meisiek | B64C 1/40 392/435 |
| 2004/0182483 | A1 * | 9/2004 | Heymes | C22F 1/05 148/552 |
| 2005/0072497 | A1 * | 4/2005 | Eberl | C22C 21/10 148/439 |
| 2006/0108058 | A1 * | 5/2006 | Chapman | B64C 1/12 156/245 |
| 2006/0162140 | A1 * | 7/2006 | Frauen | B64F 5/10 228/49.1 |
| 2007/0107189 | A1 * | 5/2007 | Prichard | B29C 33/307 29/448 |
| 2008/0111024 | A1 * | 5/2008 | Lee | B64C 1/068 244/119 |
| 2008/0265094 | A1 * | 10/2008 | Van Der Veen | B64C 3/185 244/123.1 |
| 2009/0320292 | A1 * | 12/2009 | Brennan | B64F 5/10 29/897.2 |
| 2010/0116934 | A1 * | 5/2010 | Herzog | B64D 11/00 244/118.5 |
| 2013/0262042 | A1 * | 10/2013 | Grellou | G06F 30/20 703/1 |
| 2016/0084285 | A1 * | 3/2016 | Westphal | F16B 2/12 244/119 |
| 2020/0086966 | A1 * | 3/2020 | Chadwell | B64D 11/0696 |
| 2020/0101571 | A1 * | 4/2020 | Datas | B66F 9/00 |
| 2020/0172267 | A1 * | 6/2020 | Darbonville | B64F 5/00 |
| 2021/0006050 | A1 * | 1/2021 | Kreiger | H02G 3/0406 |
| 2021/0006051 | A1 * | 1/2021 | Kreiger | H02G 1/08 |
| 2021/0016901 | A1 * | 1/2021 | Datas | B25J 9/0033 |
| 2021/0197984 | A1 * | 7/2021 | Datas | B64C 1/12 |
| 2021/0206467 | A1 * | 7/2021 | Sjostrom | B64C 1/20 |
| 2021/0229837 | A1 * | 7/2021 | Brindeau | B64F 5/50 |
| 2021/0237905 | A1 * | 8/2021 | Godard | B64F 5/10 |
| 2024/0025559 | A1 * | 1/2024 | Datas | B64F 5/10 |
| 2024/0308650 | A1 * | 9/2024 | Orteu | B64C 25/16 |

\* cited by examiner

AIRCRAFT FLOOR GRID TRANSPORT SYSTEM FOR ASSEMBLING AN AIRCRAFT FUSELAGE BARREL AND METHOD OF CALIBRATING SAID TRANSPORT SYSTEM

CROSS REFERENCE TO RELATED APPLICATION

This application claims priority to French Application Number FR 2207611, filed Jul. 25, 2022, the entire contents of which is hereby incorporated by reference.

BACKGROUND

The present disclosure is directed toward a cabin floor grid transport system intended to manipulate a cabin floor grid of an aircraft for assembling a fuselage barrel without the grid being deformed. The present disclosure also concerns a method of calibrating the transport system.

A fuselage barrel of an aircraft generally comprises a plurality of elements, in particular a cabin floor grid of the aircraft, a lower shell, two side shells and an upper shell. These elements are manufactured independently of one another and the holes enabling them to be assembled together are drilled before assembling them. Assembling these elements therefore requires the use of hole-to-hole and/or part-to-part assembly techniques in order to be sure that they are correctly aligned during assembly.

Now, during assembly of the elements, the floor grid may become curved because of its own weight, which can be a disadvantage for assembling the fuselage barrel.

SUMMARY

The present invention remedies this disadvantage. The present invention encompasses a system for transporting an aircraft floor grid intended to manipulate a floor grid of an aircraft to assemble a fuselage barrel.

According to an exemplary embodiment, the transport system comprises at least:
- a rectangular spreader having an upper face and a lower face, the rectangular spreader having two longitudinal ends;
- a stabilizer device configured to be associated with referential positioning devices of an assembly platform, the stabilizer device being located at and fixed to the two longitudinal ends of the rectangular spreader;
- a plurality of fixing devices distributed over the lower face of the rectangular spreader and configured for fixing the floor grid to the rectangular spreader, each of the fixing devices including a fixing element intended to be fixed to the floor grid, each of the fixing devices having an adjustment length between the fixing element and the lower face of the rectangular spreader that is adjustable vertically.

Thus, thanks to the plurality of fixing devices that allow adjustment of their length it is possible for the floor grid to remain sufficiently flat to enable easier and faster assembly of the fuselage barrel, even if the rectangular spreader is not perfectly flat.

Moreover, each of the fixing devices further includes:
- a threaded rod having a longitudinal axis and passing completely through the rectangular spreader, the threaded rod having a first end projecting on the upper face of the rectangular spreader and a second end projecting on the lower face, the second end being connected to the fixing element,
- a threaded bearing immobile along an axis perpendicular to the rectangular spreader, the threaded rod being screwed into the threaded bearing,
- an adjuster screw screwed onto and fastened to the first end of the threaded rod;
the adjustment length being adjustable vertically by rotation of the adjustment nut driving rotation of the threaded rod about its longitudinal axis, rotation of the threaded rod screwed into the threaded bearing driving movement of the threaded rod along its longitudinal axis, the movement of the threaded rod driving movement of the fixing element relative to the lower face of the rectangular spreader.

Moreover, each of the fixing devices further includes a ball joint connecting the second end of the threaded rod to the fixing element.

Moreover, each of the fixing devices further includes:
- a cylindrical sleeve passing perpendicularly and completely through the rectangular spreader, the threaded rod being housed in the cylindrical sleeve, and
- a ball disposed on a shoulder in the cylindrical sleeve and having a center about which the ball is able to rotate, the ball having the threaded bearing pass through it, the ball allowing movement of the threaded rod about the center of the ball, the movement being limited by the cylindrical sleeve.

Moreover, the stabilizer device includes two pairs of retractable arms each disposed at a longitudinal end of the rectangular spreader, the retractable arms of each of the two pairs of arms being spaced from one another on either side of a central plane of symmetry, each of the retractable arms of each of the two pairs being configured to be located alternately in a deployed position in which the retractable arm projects laterally from the rectangular spreader and a retracted position in which the retractable arm does not project laterally from the rectangular spreader, each of the retractable arms having a free end intended to be placed on a referential positioning device of an assembly platform when each of the retractable arms is in the deployed position for assembly of the fuselage barrel.

In accordance with one particular feature, each of the retractable arms includes at least a first part mounted to slide on the rectangular spreader, a second part having a longitudinal axis perpendicular to the rectangular spreader and a third part connecting the first part and the second part, the second part including the free end intended to be placed on a referential positioning device of an assembly platform.

In accordance with another particular feature, the rectangular spreader includes rails fixed to two sides of the rectangular spreader at the longitudinal ends, the rails being parallel to the lower face of the rectangular spreader, and each of the retractable arms includes at least one slider fixed to the first part, the slider or sliders of each of the retractable arms being intended to slide on at least one of the rails fixed to the rectangular spreader to go from the deployed position to the retracted position and vice versa.

Moreover, each of the retractable arms includes an immobilizer device configured to immobilize the retractable arms alternately in the retracted position or the deployed position.

Moreover, each of the fixing devices includes a laser target configured to receive an alignment laser beam emitted by a laser alignment system intended to evaluate the position of each fixing element of each of the fixing devices.

Moreover, the rectangular spreader includes:
- a rectangular grid including weft bars and warp bars,
- a reinforcing structure that projects on the upper face of the rectangular spreader, the reinforcing structure including U-shaped bars extending between the two longitudinal ends, the U-shape having an opening directed toward the rectangular grid, each of the U-shaped bars being aligned vertically with a warp bar of the rectangular grid, each of the U-shaped bars being fixed to the rectangular grid with the aid of spacers at each crossover between the weft bars and the warp bars of the rectangular grid.

The invention also concerns a method of calibrating the cabin floor grid transport system as described hereinabove.

According to the invention, the method comprises the following steps:
- a step of installing the transport system on the referential positioning devices by means of the stabilizer device,
- a first evaluation step of evaluating the position of the fixing element of each of the fixing devices,
- a step of comparing positions evaluated in the evaluation step with positions evaluated from a numerical simulation simulating the rectangular spreader deformed by its own weight when not loaded,
- a step of adjusting the adjustment length of each of the fixing devices on the basis of a numerical simulation simulating the transport system deformed by its own weight when not loaded and by the floor grid attached to the rectangular spreader,
- a step of attaching the floor grid to the transport system by means of the fixing elements,
- a second evaluation step of evaluating the position of the fixing element of each of the fixing devices,
- a step of adjusting the adjustment length of at least one fixing device if the second evaluation step indicates that the fixing elements of all the fixing devices are not in a common horizontal plane.

In accordance with one particular feature, the step of installing the transport system includes deploying the retractable arms before depositing the free end of each of the retractable arms on a referential positioning device.

In accordance with another particular feature, the first evaluation step and the second evaluation step are performed by the laser alignment system emitting an alignment laser beam onto the laser target of each of the fixing devices.

The invention also concerns a method of installing an aircraft floor grid on referential positioning devices of an assembly platform receiving a lower shell of a fuselage barrel in order to assemble the fuselage barrel using a transport system as described above.

According to the invention, the method comprises the following steps:
- a step of procuring the floor grid,
- a step of fixing the floor grid to the plurality of fixing devices,
- a step of installing the stabilizer device of the transport system to which the floor grid is fixed on the referential positioning devices of the assembly platform receiving the lower shell.

In accordance with one particular feature the method further comprises a step of calibration of the transport system in accordance the method for calibration of the transport system as described hereinabove.

BRIEF DESCRIPTION OF THE DRAWINGS

For an understanding of embodiments of the disclosure, reference is now made to the following description taken in conjunction with the accompanying drawings.

DETAILED DESCRIPTION

Some embodiments will now be described with reference to the Figures.

Figure 1:
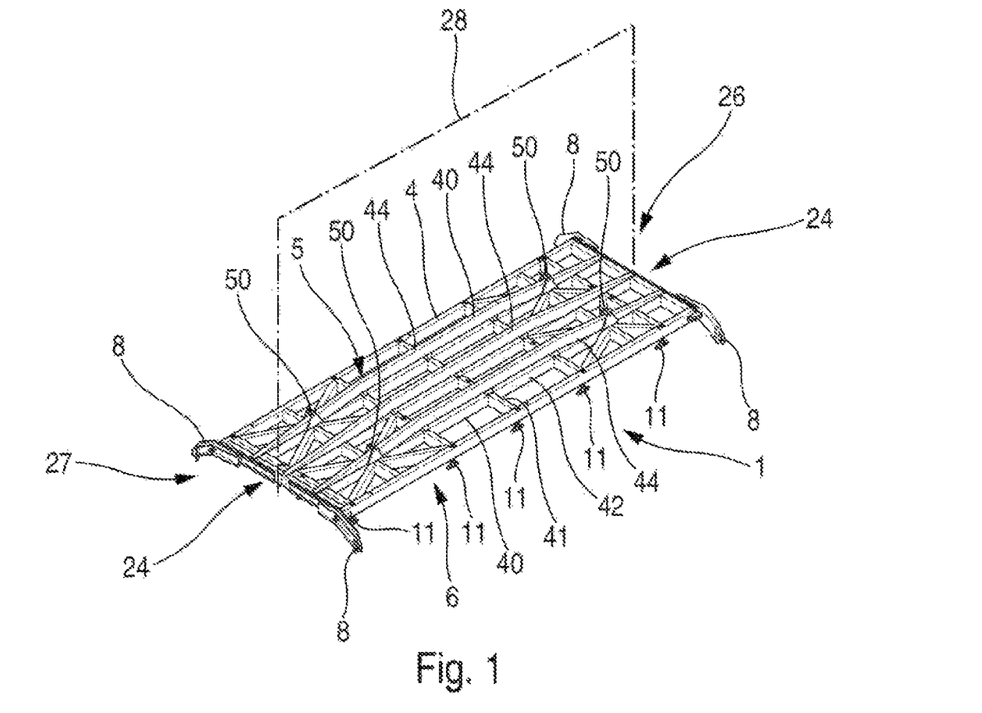
FIG. 1 is a perspective view from above of an exemplary embodiment of the transport system.

The transport system 1 for a floor grid 2 is represented in FIG. 1. The remainder of the description refers to it as the "transport system 1".

Figure 2:
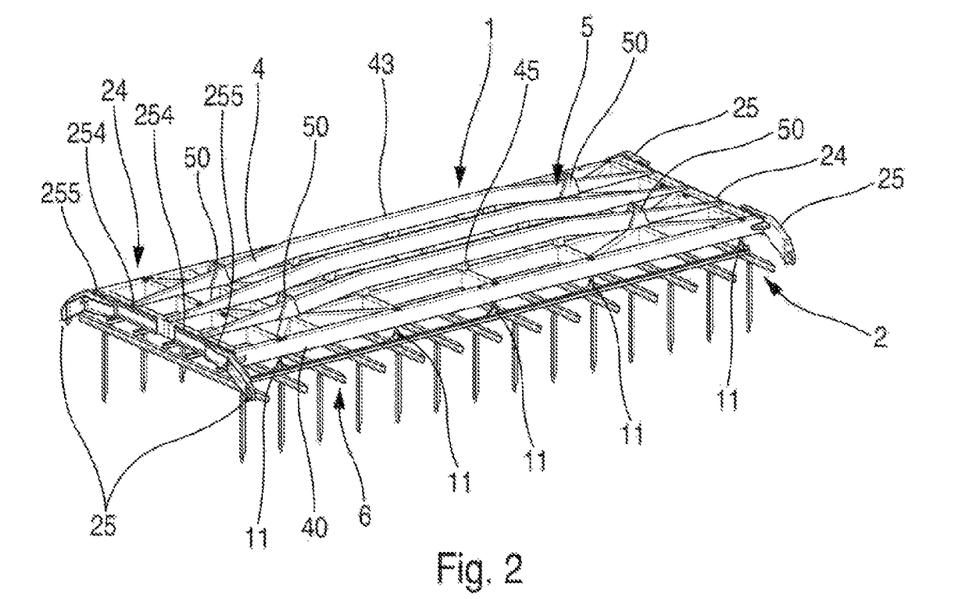
FIG. 2 is a perspective view of an exemplary embodiment of the transport system to which a cabin floor grid is fixed.

The transport system 1 is intended to manipulate a floor grid 1 of an aircraft AC in order to assemble a fuselage barrel 3. FIG. 2 represents the transport system 1 to which a floor grid 2 is attached.

By way of non-limiting example the floor grid 2 may be a cabin floor grid or a cockpit floor grid.

In the description the term "central plane of symmetry" of an object denotes a plane that divides the object into two equal parts in a longitudinal direction of the object. The adjective "lateral" denotes a part that is situated on one and/or the other side of the central plane of symmetry.

The term "longitudinal ends" of an object denotes the longitudinally opposite ends of the object. The adjective "vertical" and the adverb "vertically" refer to the direction of gravity.

Moreover, the adjectives "upper" and "lower" are defined relative to the ground over which the transport system 1 can be moved. An object denoted by the adjective "lower" is situated closer to the ground than an object denoted by the adjective "upper".

The transport system 1 includes a rectangular spreader 4 that has an upper face 5, a lower face 6 and two longitudinal ends 26 and 27.

Figure 4:
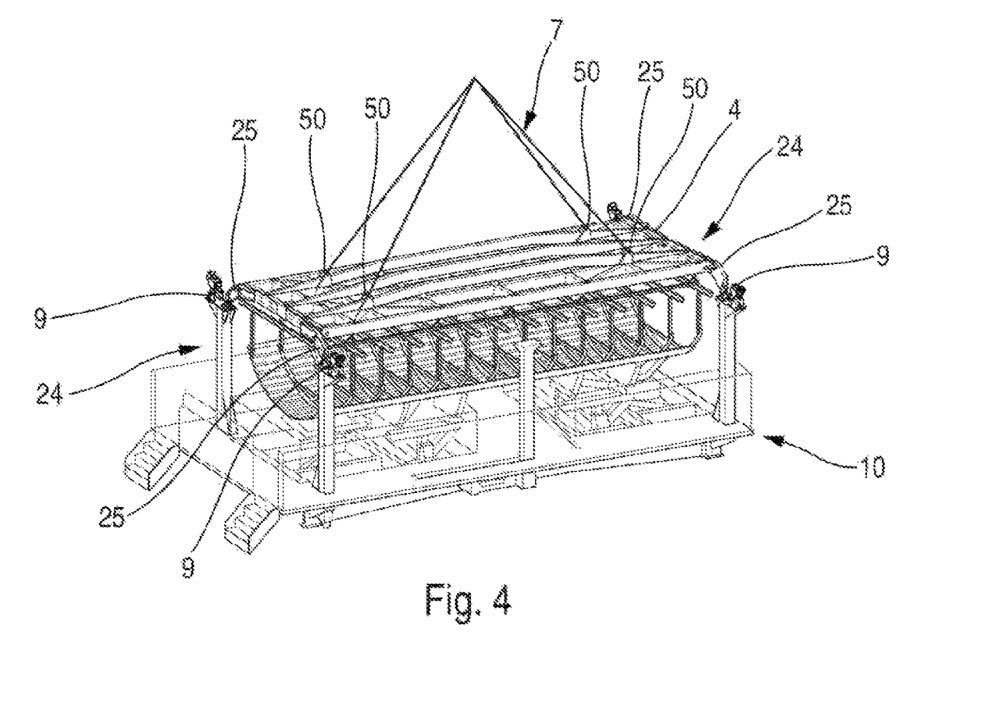
FIG. 4 is a perspective view of an assembly platform holding a lower shell and a cabin floor grid transported by the transport system.

For example, the upper face 5 is configured to be fixed to slings 7 (FIG. 4). The slings 7 enable the transport system 1 to be connected to a manipulation system such as a crane in order to move or to manipulate the transport system 1. For fixing the slings the upper surface 5 may include fixing elements 50 for fixing to the slings 7.

Figure 7:
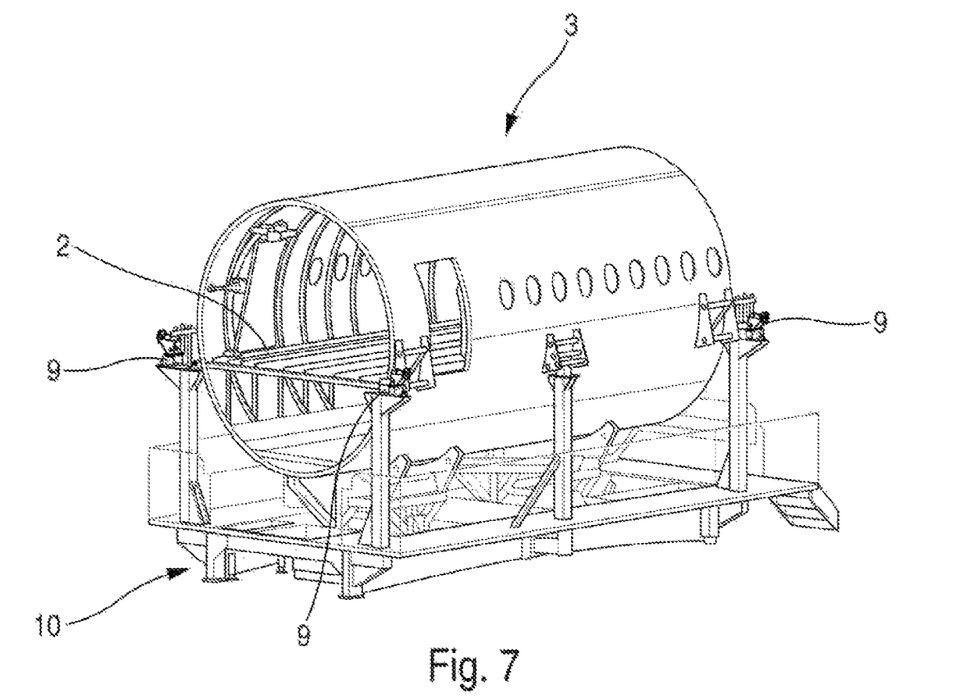
FIG. 7 is a perspective view of an assembly platform on which the fuselage barrel is retained.
Figure 8:
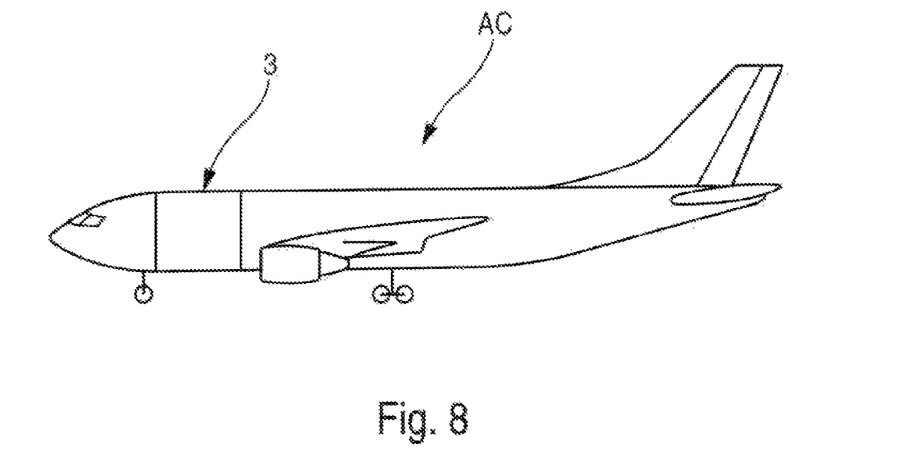
FIG. 8 is a schematic profile view of an aircraft including a fuselage barrel.
Figure 10:
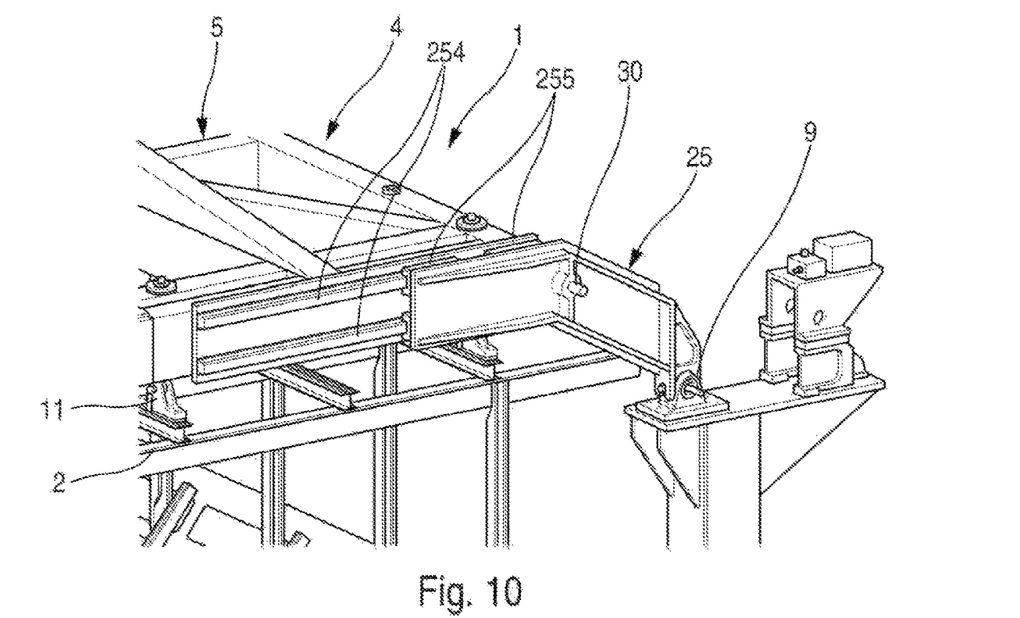
FIG. 10 is a perspective view of one end of an arm placed on a referential positioning device of an assembly platform.

The transport system 1 also includes a stabilizer device 8 configured for installing the transport system 1 on referential positioning devices 9 of an assembly platform 10 (FIG. 4, FIG. 7, FIG. 10). The stabilizer device is located at and fixed to the two longitudinal ends 26 and 27 of the rectangular spreader 4.

The transport system also includes a plurality of fixing devices 11 distributed over the lower face 6 of the rectangular spreader 4. Each of the fixing devices 11 includes a fixing element 12 intended to attach the floor grid 2 to the rectangular spreader 4. Each of the fixing devices 11 has an adjustment length L between the fixing element 12 and the lower face 6 of the rectangular spreader 4 that is adjustable vertically.

Figure 6:
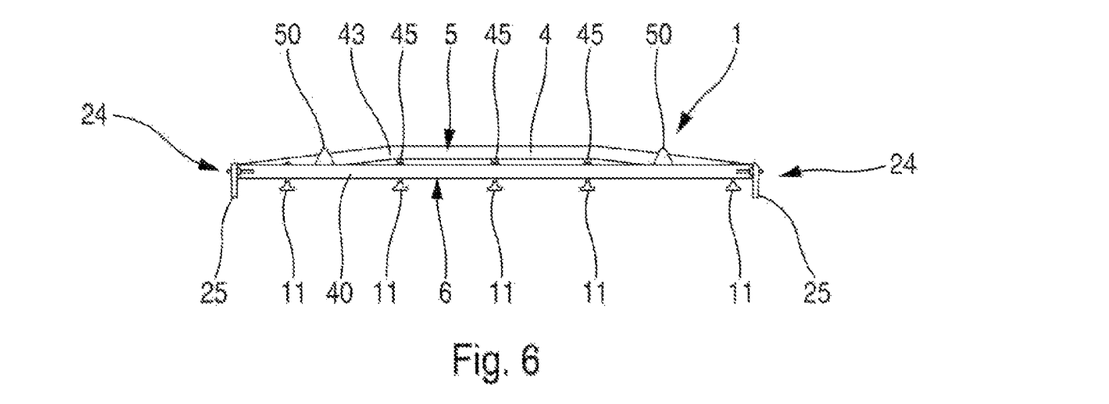
FIG. 6 is a profile view of one lateral side of the transport system.

The fixing devices 11 may be regularly distributed in rows in a transverse direction of the rectangular spreader 4 and in columns in a longitudinal direction of the rectangular spreader 4. By way of non-limiting example, and as represented in FIG. 6, the transport system 1 includes five rows of fixing devices 11. Each row of fixing devices 11 may comprise a plurality of fixing devices 11. Referring to FIG. 6, each row of fixing devices 11 comprises five fixing devices 11, which corresponds to five columns of fixing devices 11.

Figure 5:
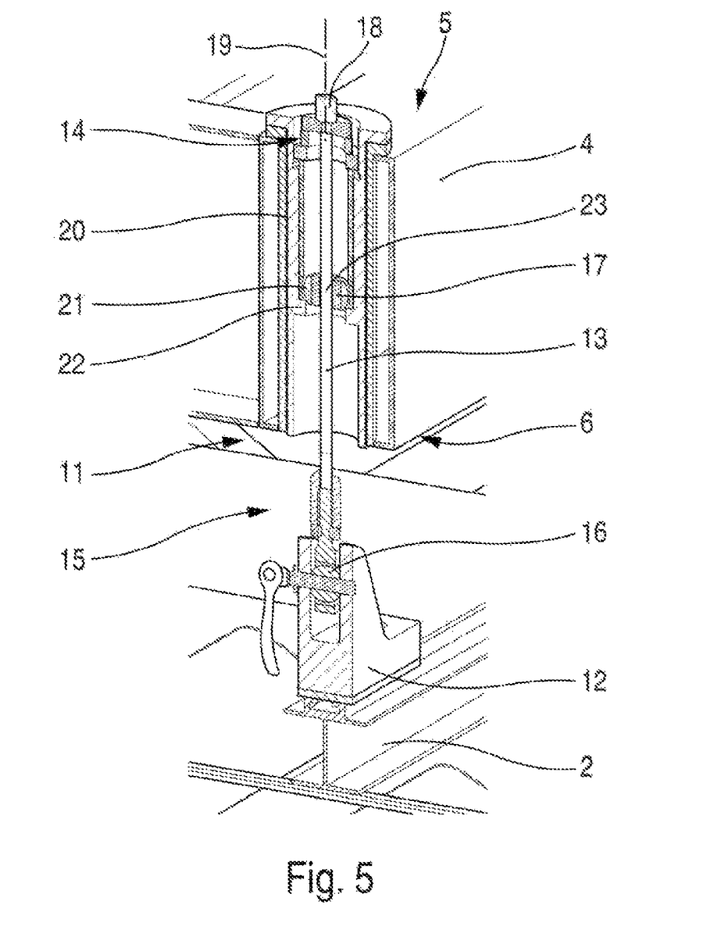
FIG. 5 is a longitudinal section of the fixing device of the transport system.

As represented in FIG. 5, each of the fixing devices 11 may include a threaded rod 13 having a longitudinal axis 19, a threaded bearing 17 and an adjuster nut 18.

The threaded rod 13 passes completely through the rectangular spreader 4. The first end 14 of the threaded rod 13 projects on the upper face 5 of the rectangular spreader 4. The second end 15 projects on the lower face 6 of the rectangular spreader 4. The threaded rod 17 is immobile along an axis perpendicular to the lower face 6. The threaded rod 13 is screwed into the threaded bearing 17.

The adjuster nut 18 is screwed onto the first end 14 of the threaded rod 13 and is fastened to the first end 14 of the threaded rod 13.

The adjustment length L is adjustable vertically by rotating the adjuster nut 18 fastened to the threaded rod 13. Rotation of the adjuster nut 18 drives rotation of the threaded rod 13 about its longitudinal axis 19. Rotation of the threaded rod 13 screwed into the threaded bearing 17 drives movement of the threaded rod 13 along its longitudinal axis 19. Movement of the threaded rod 13 along its longitudinal axis 19 then drives movement of the fixing element 12 relative to the lower face 6 of the rectangular spreader 4. Thus the adjustment length L is adjustable.

Each of the fixing devices 11 may also include a ball joint 16 connecting the second end 15 of the threaded rod 13 to the fixing element 12. This ball joint 16 enables articulation of the threaded rod 13 and the fixing element 12. It also makes it possible to facilitate rotation of the threaded rod 13 about its longitudinal axis 19 when adjusting the adjustment length L.

For example, the ball joint 16 may include a ball fixed to the second end 15 of the threaded rod 13. The ball is then housed in a ball housing of the fixing element 12 in order to articulate the threaded rod 13 to the fixing element 12.

Moreover, each of the fixing device 11 may also include a cylindrical sleeve 20 and a ball 21. The cylindrical sleeve 20 passes perpendicularly completely through the rectangular spreader 4. The threaded rod 13 is housed in the cylindrical sleeve 20.

Figure 9:
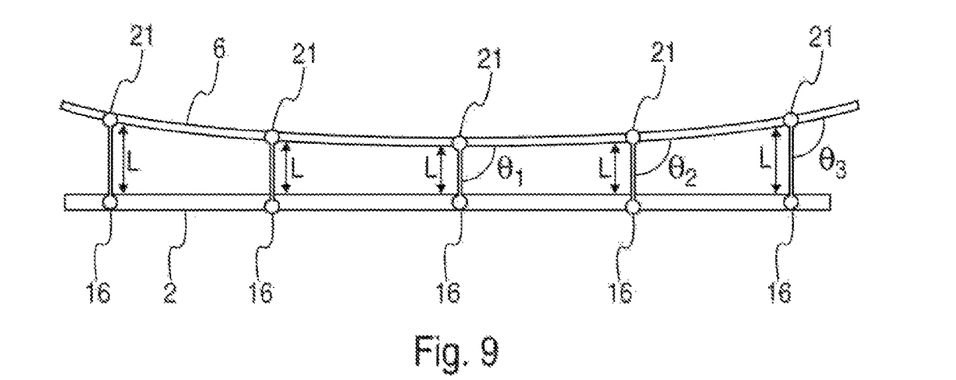
FIG. 9 is a schematic adjustment of the fixing devices in order to maintain the floor grid flat.

The ball 21 is disposed on a shoulder 22 in the cylindrical sleeve 20. The ball 21 has a center 23 about which the second ball 21 is able to rotate. The ball 21 has the threaded bearing 17 passing through it along the diameter. The ball 21 therefore allows movement of the threaded rod 13 about the center 23 of the ball 21. The movement is limited by the cylindrical sleeve 20. The amplitude of the movement of the threaded rod 13 in the cylindrical sleeve 20 is proportional to the ratio between the diameter of the cross section of the cylindrical sleeve 20 and the diameter of the cross section of the threaded rod 13. The ball 21 makes it possible to take into account curvature of the rectangular spreader 4 caused by its own weight and by the weight of the floor grid 4 that is attached to the rectangular spreader 4. FIG. 9 depicts such curvature of the rectangular spreader 4. Thanks to the ball 21 of each of the fixing devices 11, the angle between the threaded rod 13 and the lower face 6 of the rectangular spreader is able to vary to adapt to the curvature of the rectangular spreader 4. In FIG. 9 the angle between the threaded rod 13 and the lower face 6 takes three different values θ1, θ2, θ3.

The stabilizer device 8 may include two pairs 24 of retractable arms 25. Each of the two pairs 24 is disposed at a longitudinal end 26, 27 of the rectangular spreader 4. Thus one pair 24 is disposed at the longitudinal end 26 and the other pair 24 is disposed at the longitudinal end 27.

The retractable arms 25 of each of the two pairs 24 are spaced from one another on either side of the central plane of symmetry 28 of the rectangular spreader 4. Each of the retractable arms 25 of each of the two pairs 24 is configured to be located either in a deployed position in which the retractable arm 25 projects laterally from the rectangular spreader 4 or in a retracted position in which the retractable arm 25 does not project laterally from the rectangular spreader 4. Each of the retractable arms 25 has a free end 29 intended to be placed on a referential positioning device 9 of an assembly platform 10 when each of the retractable arms 25 is in the deployed position for assembling the fuselage barrel 3. The free end 29 of each of the retractable arms 25 has a shape enabling the absence of clearance between the free end 29 and the referential positioning device 9 on which it is intended to be placed.

Figure 3:
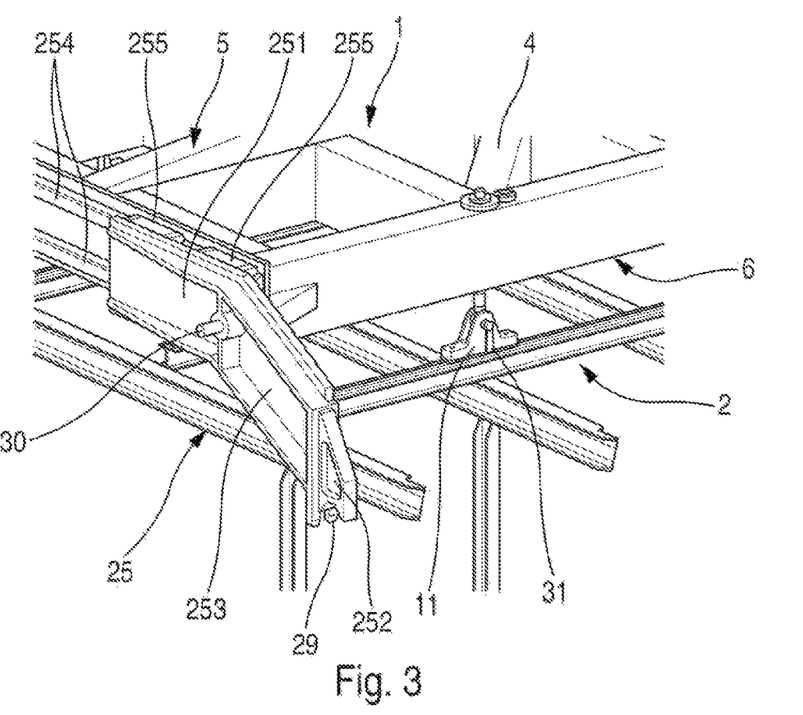
FIG. 3 is a perspective view of a detail of the transport system centered on a retractable arm of the transport system.

Each of the retractable arms 25 may have at least a first part 251 mounted to slide on the rectangular spreader 4, a second part 252 having a longitudinal axis perpendicular to the rectangular spreader 4 and a third part 253 connecting the first part 251 and the second part 252 (FIG. 3). The second part 252 includes the free end 29 intended to be placed on a referential positioning device 9 of an assembly platform 10. The third part 253 may have a longitudinal axis at an acute angle to the lower face 6 of the rectangular spreader 4, extending in the central plane of symmetry 28. Each of the first part 251 and the second part 252 is disposed at a longitudinal end of the third part 253. Thus the free ends 29 of all the retractable arms 25 are situated substantially in a common plane. That common plane is situated under the lower face 6 of the rectangular spreader 4, the third part 253 extending downward from the rectangular spreader 4.

Moreover, each of the retractable arms 25 is able to go from a deployed position to a retracted position and vice versa by the arms sliding relative to the rectangular spreader 4.

To this end, as represented in FIGS. 2, 3, and 10, the rectangular spreader 4 includes rails 254 fixed to two sides of the rectangular spreader 4 situated at the longitudinal ends 26, 27. The rails 254 are substantially parallel to the lower face 6 of the rectangular spreader 4. Each of the retractable arms 25 includes at least one slider 255 fixed to the first part 251 of the retractable arms 25. The or each of the sliders 255 of each of the retractable arms 25 is intended to slide on at least one of the rails 254 fixed to the rectangular spreader 4 to go from the deployed position to the retracted position and vice versa.

Each of the retractable arms 25 advantageously includes an immobilizer device 30 configured to immobilize each of the retractable arms 25 either in the retracted position or in the deployed position. As represented in FIGS. 3 and 10, the immobilizer device 30 may be a rod. In order to immobilize a retractable arm 25 in one position, the rod is introduced into a first hole through the retractable arm 25 and a second hole in the rectangular spreader 4.

Each of the fixing devices 11 may also include a laser target 31 configured to receive an alignment laser beam emitted by a laser alignment system intended to evaluate the position of each fixing element 12 of each of the fixing devices 11 (FIG. 3).

The rectangular spreader 4 may include a rectangular grid 40 and a reinforcing structure 43 (FIG. 6).

The rectangular grid 40 includes weft bars 41 parallel to the transverse direction of the rectangular spreader 4 and warp bars 42 parallel to the longitudinal direction of the rectangular spreader 4 (FIG. 1).

The reinforcing structure 43 projects on the upper face 5 of the rectangular spreader 4. The reinforcing structure 43 includes U-shaped bars 44 extending between the two longitudinal ends 26, 27 of the rectangular spreader 4. The U-shape has an opening directed toward the rectangular grid 40. Each of the U-shaped bars 44 is aligned vertically with a warp bar 42 of the rectangular grid 40. Each of the U-shaped bars 44 is fixed to the rectangular grid 40 with the aid of spacers 45 at each crossover between the weft bars 41 and the warp bars 42 of the rectangular grid 40. The reinforcing structure 43 makes it possible to contribute to limiting the curvature of the rectangular spreader 4 because of its own weight and/or the weight of the floor grid 2 attached to the rectangular spreader 4. The fixing devices 11 are advantageously placed at the crossovers between the weft bars 41 and the warp bars 42 of the rectangular grid 40.

The invention also concerns a method of calibrating the transport system 1.

Figure 11:
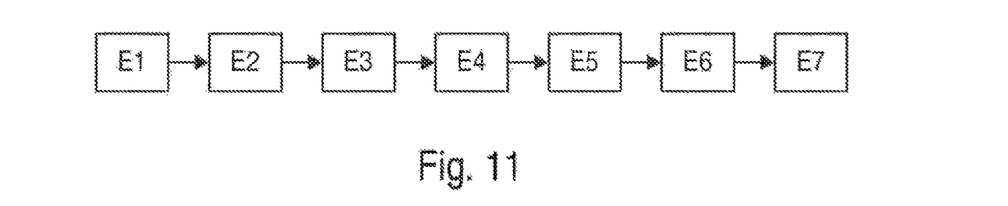
FIG. 11 is a schematic flow chart illustrating the steps of the calibration method.

The method comprises the following steps:
- a step E1 of installing the transport system 1 on the referential positioning devices 9 by means of the stabilizer device 8,
- a first evaluation step E2 of evaluating the position of the fixing element 12 of each of the fixing devices 11,
- a step E3 of comparing positions evaluated in the evaluation step with positions evaluated from a numerical simulation simulating the rectangular spreader 4 deformed by its own weight when not loaded,
- a step E4 of adjusting the adjustment length L of each of the fixing devices 11 on the basis of a numerical simulation simulating the transport system 1 deformed by its own weight when not loaded and by the floor grid 2 attached to the rectangular spreader 4,
- a step E5 of attaching the floor grid 2 to the transport system 1 by means of the fixing elements 12,
- a second evaluation step E6 of evaluating the position of the fixing element 12 of each of the fixing devices 11,
- a step E7 of adjusting the adjustment length L of at least one fixing device 11 if the second evaluation step E6 indicates that the fixing elements 12 of all the fixing devices 11 are not in a common horizontal plane.

The numerical simulation may correspond to the generalized finite element method.

Step E1 of installing the transport system 1 may include deployment of the retractable arms 25 before depositing the free end 29 of each of the retractable arms 25 on a referential positioning device 9.

Evaluation step E2 and evaluation step E6 may be performed by the alignment system using a laser emitting an alignment laser beam onto the laser target 31 of each of the fixing devices 11.

Figure 12:
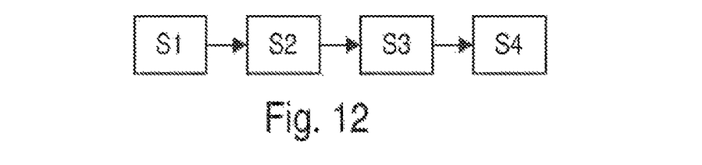
FIG. 12 is a schematic flow chart illustrating the steps of the installation method.

The invention also concerns a method of installing an aircraft floor grid 2 on referential positioning devices 9 of an assembly platform 10 receiving a lower shell 32 of the fuselage barrel 3 in order to assemble the fuselage barrel 3 using the transport system 1 (FIG. 12).

The method comprises the following steps:
- a step S1 of procuring the floor grid 2,
- a step S3 of fixing the floor grid 2 to the plurality of fixing devices 11,
- a step S4 of installing the stabilizer device 8 of the transport system 1 to which the floor grid 2 is fixed on the referential positioning devices 3 of the assembly platform 10 receiving the lower shell 32.

The method may also include a step S2 of calibration of the transport system 1 using the method of calibration of the transport system 1.

The calibration step S2 need not be performed systematically for each floor grid 2 that the transport system 1 is called upon to transport. For example, the calibration step S2 may be performed regularly after a predetermined number of floor grids 2 have been transported by the transport system 1.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for transporting an aircraft floor grid configured to manipulate a floor grid of an aircraft to assemble a fuselage barrel, comprising:
   - a rectangular spreader having an upper face and a lower face, the rectangular spreader having two longitudinal ends;
   - a stabilizer device configured to associate with referential positioning devices of an assembly platform, the stabilizer device is located at and fixed to the two longitudinal ends of the rectangular spreader;
   - a plurality of fixing devices distributed over the lower face of the rectangular spreader and configured for fixing the floor grid to the rectangular spreader, each of the fixing devices including a fixing element configured to fix to the floor grid, each of the fixing devices having an adjustment length (L) between the fixing element and the lower face of the rectangular spreader that is adjustable vertically.

2. The system as claimed in claim 1, wherein each of the fixing devices further includes:
   - a threaded rod having a longitudinal axis and passing completely through the rectangular spreader, the threaded rod having a first end projecting on the upper face of the rectangular spreader and a second end projecting on the lower face, the second end is connected to the fixing element, a threaded bearing immobile along an axis perpendicular to the rectangular spreader, the threaded rod is screwed into the threaded bearing, an adjuster screw screwed onto and fastened to the first end of the threaded rod, the adjustment length (L) is adjustable vertically by rotation of the adjustment nut driving rotation of the threaded rod about its longitudinal axis, rotation of the threaded rod screwed into the threaded bearing driving movement of the threaded rod along its longitudinal axis, the movement of the threaded rod driving movement of the fixing element relative to the lower face of the rectangular spreader.

3. The system as claimed in claim 2, wherein each of the fixing devices further comprises a ball joint connecting the second end of the threaded rod to the fixing element.

4. The system as claimed in claim 1, wherein each of the fixing devices further comprises:
   a cylindrical sleeve passing perpendicularly and completely through the rectangular spreader, the threaded rod is housed in the cylindrical sleeve, and
   a ball disposed on a shoulder in the cylindrical sleeve and having a center about which the ball is able to rotate, the ball having the threaded bearing pass through it, the ball allowing movement of the threaded rod about the center of the ball, the movement is limited by the cylindrical sleeve.

5. The system as claimed in claim 1, wherein the stabilizer device further includes two pairs of retractable arms each disposed at a longitudinal end of the rectangular spreader, the retractable arms of each of the two pairs of arms is spaced from one another on either side of a central plane of symmetry,
   wherein each of the retractable arms of each of the two pairs is configured to locate alternately in a deployed position in which the retractable arm projects laterally from the rectangular spreader and a retracted position in which the retractable arm does not project laterally from the rectangular spreader, and
   wherein each of the retractable arms includes a free end configured to place on a referential positioning device of an assembly platform when each of the retractable arms is in the deployed position for assembly of the fuselage barrel.

6. The system as claimed in claim 5, wherein each of the retractable arms includes at least a first part mounted to slide on the rectangular spreader, a second part having a longitudinal axis perpendicular to the rectangular spreader and a third part connecting the first part and the second part, the second part including the free end intended to place on a referential positioning device of an assembly platform.

7. The system as claimed in claim 6, wherein the rectangular spreader further comprises rails fixed to two sides of the rectangular spreader at the longitudinal ends, the rails are parallel to the lower face of the rectangular spreader, and each of the retractable arms includes at least one slider fixed to the first part, the slider or sliders of each of the retractable arms are intended to slide on at least one of the rails fixed to the rectangular spreader to go from the deployed position to the retracted position and vice versa.

8. The system as claimed in claim 5, wherein each of the retractable arms further includes an immobilizer device configured to immobilize the retractable arms alternately in the retracted position or the deployed position.

9. The system as claimed in claim 1, wherein each of the fixing devices further includes a laser target configured to receive an alignment laser beam emitted by a laser alignment system intended to evaluate the position of each fixing element of each of the fixing devices.

10. The system as claimed in claim 1, wherein the rectangular spreader further comprises:
    a rectangular grid including weft bars and warp bars,
    a reinforcing structure that projects on the upper face of the rectangular spreader, the reinforcing structure including U-shaped bars extending between the two longitudinal ends, the U-shape having an opening directed toward the rectangular grid,
    wherein each of the U-shaped bars is aligned vertically with a warp bar of the rectangular grid, and
    wherein each of the U-shaped bars is fixed to the rectangular grid with the aid of spacers at each crossover between the weft bars and the warp bars of the rectangular grill.

11. A method of calibrating the cabin floor grid transport system as claimed in claim 1, comprising:
    a step (E1) of installing the transport system on the referential positioning devices by means of the stabilizer device,
    a first evaluation step (E2) of evaluating the position of the fixing element of each of the fixing devices,
    a step (E3) of comparing positions evaluated in the evaluation step with positions evaluated from a numerical simulation simulating the rectangular spreader deformed by its own weight when not loaded,
    a step (E4) of adjusting the adjustment length (L) of each of the fixing devices on the basis of a numerical simulation simulating the transport system deformed by its own weight when not loaded and by the floor grid attached to the rectangular spreader,
    a step (E5) of attaching the floor grid to the transport system by means of the fixing elements,
    a second evaluation step (E6) of evaluating the position of the fixing element of each of the fixing devices, and
    a step (E7) of adjusting the adjustment length (L) of at least one fixing device if the second evaluation step (E6) indicates that the fixing elements of all the fixing devices are not in a common horizontal plane.

12. The method as claimed in claim 11, wherein the step (E1) of installing the transport system further includes deploying the retractable arms before depositing the free end of each of the retractable arms on a referential positioning device.

13. The method as claimed in claim 11, wherein the first evaluation step (E2) and the second evaluation step (E6) are performed by the laser alignment system emitting an alignment laser beam onto the laser target of each of the fixing devices.

14. A method of installing an aircraft floor grid on referential positioning devices of an assembly platform receiving a lower shell of a fuselage barrel in order to assemble the fuselage barrel using a transport system as claimed in claim 1, comprising:
    a step (S1) of procuring the floor grid,
    a step (S3) of fixing the floor grid to the plurality of fixing devices, and
    a step (S4) of installing the stabilizer device of the transport system to which the floor grid is fixed on the referential positioning devices of the assembly platform receiving the lower shell.

15. The method as claimed in claim 14, further comprising a step (S2) of calibrating the transport system.

* * * * *